United States Patent [19]

St. Martin et al.

[11] Patent Number: 5,013,564

[45] Date of Patent: May 7, 1991

[54] REDUCED MONASCUS PIGMENT DERIVATIVES AS YELLOW FOOD COLORANTS

[75] Inventors: Edward J. St. Martin, Libertyville; Paul R. Kurek, Barrington; Elaine F. Schumacher, Arlington Heights; Ronald P. Rohrbach, Forest Lake, all of Ill.

[73] Assignee: UOP, Des Plaines, Ill.

[21] Appl. No.: 562,880

[22] Filed: Aug. 3, 1990

[51] Int. Cl.$^5$ ............................................. A23L 1/275
[52] U.S. Cl. .................................... 426/250; 426/540; 435/911
[58] Field of Search ................................ 426/250, 540

[56] References Cited

U.S. PATENT DOCUMENTS 3,765,906 10/1973 Yamaguchi et al. ................. 99/148
3,993,789 11/1976 Moll et al. ............................ 426/250

OTHER PUBLICATIONS

Food Technology, p. 49 (Jul. 1986).
B. C. Fielding et al., Tetrahedron Letters No. 5, 24–7 (1960).
Y. Inouye et al., Tetrahedron, 18, 1195 (1962).
Kumasaki et al., Tetrahedron, 18, 1171 (1962).
Wong and Koehler, J. Food Science, 48, 1200 (1983).

Primary Examiner—Jeanette Hunter
Attorney, Agent, or Firm—Thomas K. McBride; Eugene I. Snyder

[57] ABSTRACT

The yellow pigments which result from reaction of the Monascus pigments monascorubrin and rubropunctatin with amines followed by reduction of the ring carbonyl moiety to an hydroxyl group have excellent properties for their use as food colorants. Yellow pigments made from amino acid esters, dipeptide esters, and amines of sugar alcohols have particular promise as desirable food colorants which are effective at levels which impart no objectionable taste to foods.

33 Claims, No Drawings

REDUCED MONASCUS PIGMENT DERIVATIVES AS YELLOW FOOD COLORANTS

BACKGROUND OF THE INVENTION

Consumers first judge the quality of the food product by its color, at least according to *Food Technology*, page 49 (July, 1986). The food industry has catered to consumer aesthetics, if not actually fostering such an attitude, by giving careful attention to the color of their products, including conducting ongoing investigations into materials which may be used as suitable food colorants.

Although naturally occurring pigments perforce were the first used food colorants, the development of chemistry as a discipline led to many synthetic dyes, especially anilines, to supplant naturally occurring pigments as food additives. As a class synthetic colorants have many advantages, such as a uniform and reproducible color, color stability, absence of flavor, and an oxidative and/or thermal and/or photostability superior to naturally occurring pigments, broad availability relatively insensitive to changes in crop yields and so forth. The resulting popularity of synthetic colorants at least is understandable.

However, with heightened awareness of a consuming public to food additives and increased testing of some representative examples came a concern about their safety. Recent years have seen some materials formerly used as food colorants run the gamut from being beyond reproach to being suspect and even banned or at least used restrictedly. For example, FD&C Red No. 2 and FD&C Violet No. 1 have been banned in the United States and many other countries. Because of a variety of allergic reactions in sensitive individuals induced by FD&C Yellow No. 5 a recent ruling by the FDA requires food colored with it be declared as such on product labels. As a consequence the pendulum has begun to swing once more toward naturally occurring pigments as food additives.

The major pigments produced by Monascus species traditionally grown on rice in the Orient are orange and relatively insoluble in water, but readily react with compounds containing amino groups to form water soluble colorants. Monascus pigments have been used in the Orient for hundreds of years as a general food colorant and as a colorant for wine and bean curd. They can be made water soluble or oil soluble and are stable at a pH range 2-10. They are heat stable and can be autoclaved. In oriental countries microorganisms of this type typically are grown on grains of rice and once the grains have been penetrated by the red mycelium the whole mass is finely ground with the resulting powder used as a food colorant.

Monascus species have been reported to elaborate several pigments, but most species seem to produce an orange pigment as the major colorant. This water-insoluble pigment is a mixture of monascorubrin and rubropunctatin, whose structures were elucidated by B. C. Fielding et al., Tetrahedron Letters, No. 5, 24-7 (1960) and Kumasaki et al., Tetrahedron, 18, 1171 (1962), and which differ in the former having a 7-carbon chain attached to the ketonic carbonyl group and the latter having a 5-carbon chain. At least some species, notably *M. purpureus*, produce a yellow pigment, monascoflavin, the reaction product of rubropunctatin with two moles of hydrogen and which arises from reduction of two conjugated olefinic bonds in the chromophore of the parent. Y. Inouye et al., Tetrahedron, 18, 1195 (1962). [Parenthetically, it may be noted that these authors state that monascoflavin is the reduction product of monascorubrin. However, monascorubrin and rubropunctatin are homologs differing in having $C_7H_{15}$ and $C_5H_{11}$ ketonic side chains, respectively, and monascoflavin is specified as having a $C_5H_{11}$ side chain. Therefore its precursor must be rubropunctatin. It must be realized that for many years there was rampant confusion between monascorubrin and rubropunctatin, with a concomitant lack of distinction, whose effects are not yet entirely dispelled.]

Although the monascorubrin-rubropunctatin mixture which constitutes the orange pigment produced as the direct fermentation product of Monascus species is water insoluble and therefore is of limited utility as a food colorant, it has been recognized for some time that these materials react with primary amines to afford red colorants, many of which are water soluble. Yamaguchi, U.S. Pat. No. 3,765,906, reported that the orange insoluble pigment, either in the fermentation medium or as an isolate, reacted with water-soluble proteins, peptides, or amino acids to afford red water-soluble pigment. The reaction of the orange water-insoluble pigment with amino sugars, polymers of amino sugars, polyamino acids, and amino alcohols is reported in U.S. Pat. No. 3,993,789. The production of red water-soluble pigment by reacting the insoluble orange pigment with aminoacetic acid and aminobenzoic acid has been reported by Wong and Koehler, *J. Food Science*, 48, 1200 (1983), who also investigated their color characteristics and stability. All of the aforementioned water-soluble red pigments are believed to have the structure II,

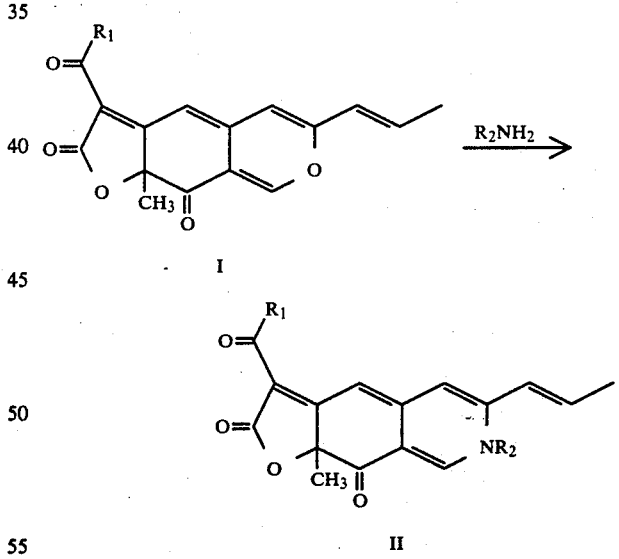

where I is a monascorubrin-rubropunctatin mixture and $R_1$ is $C_5H_{11}$ or $C_7H_{15}$. Despite the interest as manifested by the numerous citations, none of the red water-soluble pigments appear to have gained broad, substantial use as a food colorant.

As previously mentioned, some Monascus species form as a fermentation product water-insoluble yellow pigment whose structure appears not to have been elucidated but which is believed to be the reduction product of rubropunctatin and monascorubrin where two of the carbon-carbon double bonds in the conjugated chain are reduced to carbon-carbon single bonds. In the course of their structure elucidation Kumasaki et al., op. cit., produced several different reduction products of monascorubrin-rubropunctatin and their ammonia adducts, depending upon the reducing method employed. In contrast to other reducing agents, sodium borohydride reduction of the ammonia adduct of the orange water-insoluble pigment effected specific reduction of the carbonyl group of the isoquinoline nucleus to an hydroxyl moiety, an observation to which we shall shortly return.

In the course of a related investigation we had occasion to reduce some amine reaction products, II, of monascorubrin-rubropunctatin mixtures using sodium borohydride and noticed this was accompanied by a color change from red to yellow. Since the replacement of the coal tar dye known as FD+C Yellow No. 5 currently is highly desirable, this observation spurred us to further investigate our reduction products; merely because a compound is yellow does not automatically qualify it as a food colorant candidate. A putative yellow food colorant needs to have adequate water solubility, needs to be color stable over a range of pH, should have a yellow color of a hue acceptable to the subjective standards current to the food industry and of an intensity relatively high to permit its use at low concentrations, and have no significant objectionable taste, preferably no taste at all, at a concentration effective to color food. The food colorants of our invention meet all these criteria.

SUMMARY OF THE INVENTION

The purpose of this invention is to provide material which will be effective as a yellow food colorant, especially in replacement of FD+C Yellow No. 5 in many food applications. In a specific embodiment the colorant has the structure given by III. In a more specific embodiment the fragment $R_2NH_2$ is an amino alcohol. In a still more specific embodiment the amino alcohol is a polyhydric amino alcohol. In yet another embodiment $R_2NH_2$ is a dipeptide, each of whose amino acid constituents is a naturally occurring amino acid. Other embodiments will become apparent from the ensuing discussion.

DESCRIPTION OF THE INVENTION

The orange water insoluble pigment elaborated by Monascus species and which is a mixture of monascorubrin and rubropunctatin has been shown to have the structure designated as I. (Throughout this text $R_1$ will designate $C_5H_{11}$ or $C_7H_{15}$.) Reaction with ammonia gives a water-soluble red pigment, II, which was reduced with sodium borohydride to give a product of structure III, resulting from specific reduction of the carbonyl group on the isoquinoline nucleus to an hydroxyl functionality. Kumasaki et al., op. cit.

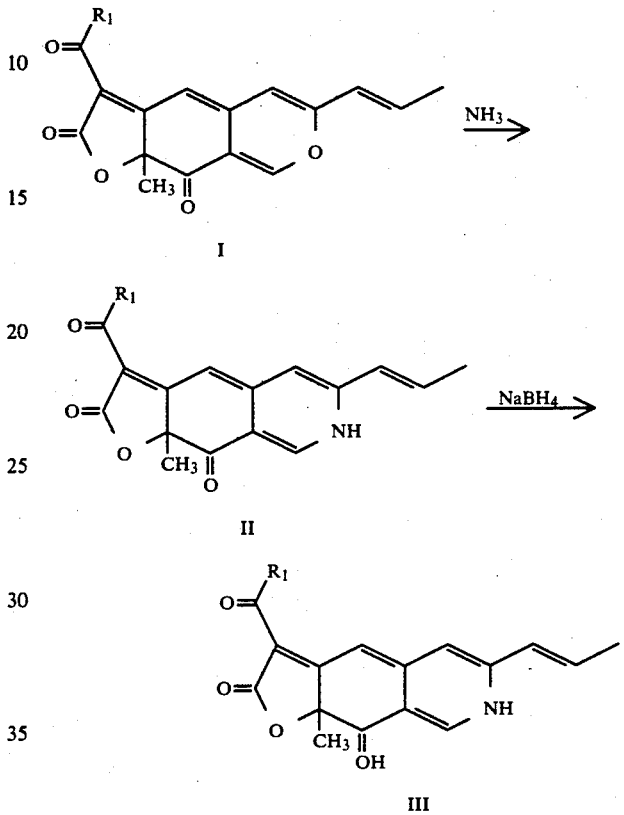

We have found that if the monascorubrin-rubropunctatin mixture I is reduced with sodium borohydride it affords a water-insoluble yellow pigment of structure VI which then can react with primary amines to afford water-soluble yellow pigments of structure III. A water-soluble yellow pigment is also produced by first forming the water-soluble red pigment II via reaction of the orange precursor pigment with amines, and subsequently reducing II with sodium borohydride.

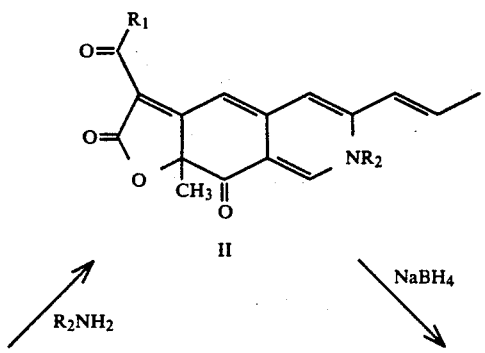

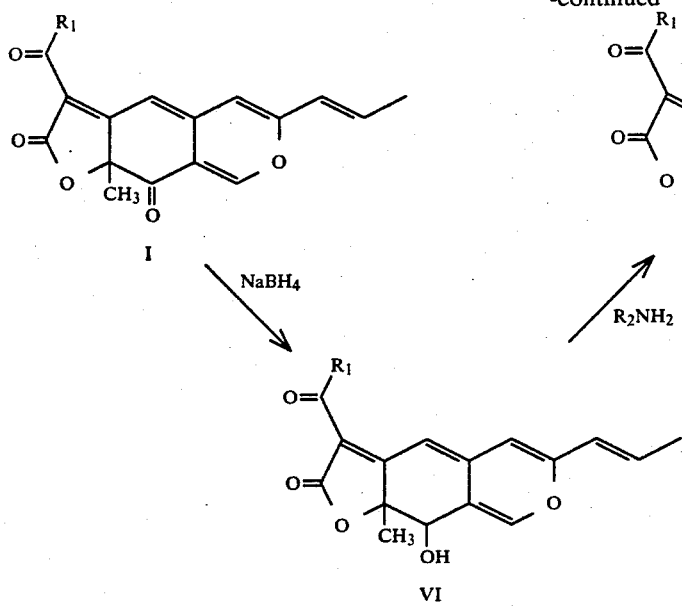
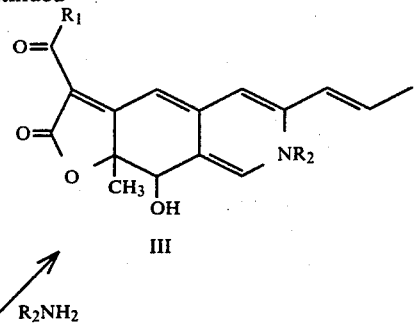

Our first task was to demonstrate that the water-soluble yellow pigment produced via reaction of the reduced yellow precursor pigment VI with amine is in fact the same as that resulting from reaction of the orange precursor pigment with amine followed by reduction. Stated differently, it was critical to show that the water-soluble yellow pigments as produced in path A and path B are identical, with both having the structure III.

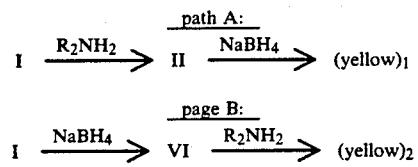

EXAMPLE I

To facilitate interpretation of NMR spectra the reactions described in this section were performed in deuterated methanol, $CD_3OD$, 99.8 atom percent deuterium, obtained from Aldrich Chemical Company. The sodium borohydride was 98+% pure and contained 0.5% magnesium carbonate. D-glucamine (1-amino-1-deoxy-D-glucitol; 1-amino-1-deoxysorbitol) was obtained from Nuodex, Inc.

The orange water-insoluble precursor pigment I, (0.300 g, 0.82 mmol) in 14.0 mL methanol was reacted with $NaBH_4$ (¼ molar equivalent plus 5 weight percent excess) at 45° C. under a nitrogen blanket with magnetic stirring. During the reaction the color of the solution changed from orange to yellow; the reaction product, which was the yellow precursor pigment VI, was water insoluble.

To 3.82 g of a methanol solution containing yellow precursor pigment as prepared in the foregoing paragraph was added an equal amount of D-glucamine (0.050 g). The reaction mixture was stirred for 15 minutes, during which the pH rose from 7.5 to 9.5. The color remained unchanged, but the reaction product was water soluble.

A solution of 0.100 g (0.27 mmol) of the orange precursor pigment I in 4.0 mL methanol was stirred with gentle heating with 0.050 g of D-glucamine. The solution immediately turned deep red to afford a water-soluble product. To 3.53 g of the solution of this red glucamine derivative was added 0.002 g sodium borohydride with magnetic stirring. After 15 minutes the reaction was complete to afford a water-soluble yellow pigment.

The $^{13}C$ NMR spectra were determined on the methanolic solutions of the reaction products. The $^{13}C$ NMR spectra of the glucamine derivatives of the reduced precursor (path B) was identical with the reduced glucamine derivative of the unreduced precursor (path A), showing that the structure of the ultimate product was invariant with the sequence of reactions. That is, the yellow pigment made according to path A is identical to the yellow pigment made in path B.

Following NMR analysis of the foregoing solutions, solvent was evaporated under flowing nitrogen to give crystalline products. These were analyzed by HPLC using as a solvent system aqueous hydrochloric acid at pH 3.0 (A) and methanol (B) going from 50:50 A:B to 30:70 A:B at 1% per minute. Analyses were performed on a Hypersil C18 column 2.1×200 mm at ambient temperature and at a flow rate of 0.5 mL/min. Chromatographic analyses were performed using a Hewlett Packard 1090 HPLC with a diode array detector. The ultraviolet absorbance at 205 and 482 nm was measured to detect elution of fractions. The major fractions (corresponding to the $C_5$ and $C_7$ isomers) had the same elution time for the water-soluble yellow pigment as produced in path A and in path B. For each of the foregoing yellow pigments, the peaks eluting at 7.7 and 16.0 minutes were scanned over the 200–600 nm region and showed virtually superimposable spectra except for the 200–220 nm region. These results also show that the yellow pigment of interest is the same whether the synthetic route is path A or path B.

Although the foregoing shows that the sequence of steps chosen for the production of water-soluble yellow pigment has no structural effects on the product, the formation of the yellow food colorants of this invention via reduction of the amine-derivatized red precursor pigment is somewhat favored as the synthetic route because reaction of the amine with the water-insoluble orange precursor pigment I occurs somewhat more readily than the analogous reaction of the amine with the reduced pigment precursor VI.

One class of amines which can be used in the yellow food colorants III of our invention are the naturally occurring amino acids. All have the L configuration and include alanine, arginine, asparagine, aspartic acid, cysteine, cystine, 3,5-dibromotyrosine, 3,5-diiodotyrosine, glutamic acid, glutamine, histidine, hydroxylysine, hydroxyproline, isoleucine, leucine, lysine, methionine, phenylalanine, proline, serine, threonine, thyroxine, tryptophane, tyrosine, and valine.

Since many of the pigments III from amino acids have a distinct taste which under some circumstances may be judged objectionable, even at the low levels required for food coloration, amino acid derivatives whose carboxylic acid group is "neutralized" are preferred, and esterification of the free carboxylic acid group(s) is favored. Esters of saturated, aliphatic alcohols are suitable, and those esters whose alkyl group contains up to 10 carbon atoms, but more particularly esters where the alkyl group contains from 1 to 4 carbon atoms, are preferred. The methyl, ethyl, and propyl esters of the foregoing natural amino acids are especially desirable in the practice of this invention. It has been found that food colorants having an $R_2$ group where $R_2NH_2$ comports with these requirements show excellent water solubility, good yellow color characteristics, and with no undesirable taste characteristics, and are preferred embodiments in the practice of our invention.

Another desirable class of food colorants corresponding to III arise when the $R_2NH_2$ amine parent of $R_2N$ is a dipeptide, especially a dipeptide each of whose constituents is one of the naturally occurring amino acids enumerated above. There is no need to list the various depeptides which can be used in the practice of our invention, since any permutation of naturally occurring amino acids in the dipeptide is acceptable. The carboxyl group in the dipeptide still leads to undesirable taste characteristics, and accordingly neutral derivatives of dipeptides, especially esters of saturated aliphatic alcohols whose alkyl group contains no more than 10 carbon atoms, and preferably 1 to 4 carbon atoms, are recommended. The dipeptide resulting from condensation of aspartic acid with phenylalanine, or asp-phe [N-L-α-aspartyl-L-phenylalanine 1-methyl ester; 3-amino-N-(α-carboxyphenethyl) succinamic acid N-methyl ester; commonly known as aspartame], is a particularly preferred dipeptide in the practice of our invention.

A further class of yellow colorants which is highly recommended is that whose members have, as the parent of the $R_2N$ fragment, $R_2NH_2$ corresponding to amino alcohols. Simple amino alcohols containing up to about 10 carbon atoms may be used although those with 2-4 carbon atoms are preferred and include the linear, terminally substituted amino alcohol such as 2-aminoethanol, 3-aminopropanol, 4-aminobutanol, 5-aminopentanol, 6-aminohexanol, 7-aminoheptanol, 8-aminooctanol, 9-aminononanol, 10-aminodecanol. Branched amino alcohols also may be used and are exemplified by such members as 2-hydroxypropylamine, 2-aminopropanol-1, 3-aminobutanol-1, 3aminobutanol-2, 2-aminobutanol-1, 1-aminobutanol-2, 1-aminobutanol-3, and so forth.

Among the amino alcohols the polyhydric amino alcohols are favored. By "polyhydric amino alcohols" are meant amino alcohols which contain more than one hydroxyl group per molecule. These are exemplified by sugar amines, especially amines of tetroses, pentoses and hexoses with the general formula $H_2NCH_2(CHOH)_n$-CHO, where n=2, 3 or 4, or formula $HOCH_2(CHOH)_x(CHNH_2)$—$(CHOH)_yCHO$, where x+y+1 is 2, 3 or 4, as illustrated by aminosorbose, glucosamine, mannosamine, and galactosamine. Amines of sugar alcohols, especially those where one of the terminal hydroxy methyl groups has been converted to an aminomethyl group, is another class of favored polyhydric alcohols, of general formula $HOCH_2(CHOH)_nCH_2NH_2$, where n is 2, 3 or 4, or $HOCH_2(CHOH)_x(CHNH_2)(CHOH)_yCH_2OH$, where x+y+1 is 2, 3, or 4, and is exemplified by such materials as 1-amino-1-deoxy-D-glucitol (1-amino-1-deoxysorbitol; glucamine), erythramine, mannamine, galactamine, ribosamine, arabinosamine, lyxosylamine, 2-aminomannitol, 2-aminoglucitol, and 2-aminoribitol.

An additional group of colorants which may be successfully used in the practice of our invention is that containing $R_2$ where $R_2NH_2$ are aliphatic and cycloaliphatic amines containing from 2 to 10 carbon atoms, especially those containing from two to six carbon atoms. Such amines include ethylamine, propylamine, butylamine, pentylamine, and hexylamine, cyclopentylamine, cyclohexylamine, methylcyclobutylamine, and so on. The major restriction on such hydrocarbon groupings is that they not be such a long chain as to substantially reduce water solubility, since the food colorants of our invention are required to have sufficiently high water solubility to permit their use as food colorants. Polymeric amines also may be used in the practice of our invention so long as they do not interfere with the requisite solubility. Examples of such amines include poly(vinylamine), poly(allylamine), poly(ethyleneamine), and so on.

The yellow food colorants of this invention have several attributes important to their successful use in edible formulations. All show absorption in the ultraviolet-visible portion of the spectrum which is somewhat concentration and solvent dependent. However, at a concentration of about $10^{-3}$ molar and in a solvent containing 50-80% methanol and 50-20% aqueous hydrochloric acid at pH 3 ($10^{-3}$ molar) all will have an absorption maximum occurring in the region of 465-515 nanometers (nm), and more preferably have a maximum in the region of 480-505 nm with an extinction coefficient of at least $4\times10^4$ (L cm mol$^{-1}$), and preferably greater than $10^5$. The food colorants also must be sufficiently soluble in water when used to color, for example, still drinks so as to impart the necessary intensity of the yellow color sought. This minimum solubility will, of course, depend upon the extinction coefficient of the particular food colorant as well as the desired color intensity. Perhaps most important of all is the requirement that when used in formulations intended for human consumption, the food colorant must not impart any perceptible objectionable taste to the edible formulation at a concentration effective to impart the desired yellow color. Even though the food colorant may be used at a very low level, some individual members may impart a noticeable and objectionable taste to the formulation being colored. This will depend not only on the particular food colorant used, but also on the particular edible formulation.

The yellow food colorants may be used alone at concentrations as low as about 50 parts per million and as high as 0.6 weight percent. When used in conjunction with other colorants, the yellow food colorants of our invention may be used in correspondingly lower levels, depending upon the concentration of the second colorant, the color and hue desired, and so forth. Our food colorants may be used in a variety of edible formulations where a yellow color is desirable. An illustrative test of foods, which is only representative but is not exhaustive of those for which our colorant is usable, includes candy, yogurt, ice cream, other frozen desserts, gelatin, carbonated and still drinks, powdered cheese mixes, formed seafood products, and meats.

The following examples are intended to be only illustrative of our invention and do not limit it in any way.

EXAMPLES

General Procedure for Synthesis of Yellow Food Colorants III.

To a 100-mL 3-neck round bottom flask equipped with a stopper, stirring bar, and pH electrode was charged 0.1 g of a water-soluble red pigment of structure II to which was added 15 g methanol. When the red pigment had completely dissolved, solid sodium borohydride was added in an amount equal to ¼ the stoichiometric quantity plus 5 weight-percent excess. An immediate yellow to brown-orange color resulted, and the mixture was stirred at 23° C. for approximately 30 minutes. An aqueous solution of 0.01M HCl was added dropwise to give a pH approximately 5.3 to decompose excess sodium borohydride, after which 20 mL of anhydrous ethanol was added. The alcohols were evaporated at 30° C. at 30 psig vacuum to afford a solid which was subsequently redissolved in ethanol. The ethanol mixture was filtered to remove inorganic materials then stripped free of ethanol to afford as the product the yellow pigment, III, used for further tests and characterization.

HPLC Analysis of Yellow Food Colorants for Purity

Purity was assessed on the basis of UV absorption at 205 nm using the chromatographic conditions given in Example 1. Colorants were dissolved in methanol at a concentration of 3.0 mg/mL and 4 microliters of the solution were injected on the column. Depending upon the hydrophobicity of the colorant the solvent gradient used was 65 to 85% methanol, 50–70% methanol, or 35–55% methanol, with the gradient varied at 1% per minute. Eluants were monitored at 205 nm, corrected for absorption by methanol. The chromatogram was integrated and purity of the colorant elution peaks (determined by absorption at 482 nm) was determined by its absorbance at 205 nm relative to the integrated absorbance of the chromatogram at 205 nm.

Ultraviolet Spectra of Yellow Pigments III

The ultraviolet spectrum of the major fractions, corresponding to the $C_5H_{11}$ and $C_7C_{15}$ isomers, was scanned from 200–600 nanometers. Scans were obtained for material eluting at times corresponding to the maximum concentration of eluent as determined by UV detectors operating at 482 or 205 nm.

The following table summarizes some of the more salient features of the yellow pigments III as prepared by us.

TABLE 1

| Selected Characteristics of Representative Pigments III | | | |
|---|---|---|---|
| Amine[a] | Purity[b] | $\lambda^c$ max | $\epsilon^d$ |
| None | 72.2 | 482 | 127147 |
| Glucamine | 96.2 | 478 | 64300 |
| Taurine | 76.2 | 476 | 76247 |
| Aspartame | 81.8 | 490 | 225517 |
| Glycine Ethyl Ester | 81.1 | 484 | 60269 |
| Glycine | 87.5 | 476 | 245359 |
| Leucine | 96.8 | 482 | 191953 |
| Isobutylamine | 95.1 | 482 | 100663 |
| Ethanolamine | 98.7 | 482 | 166341 |

[a] $R_2NH_2$, where $R_2$ refers to that in III.
[b] Purity was calculated from HPLC data (detector at $\lambda$ = 205 nm) using area percent of $C_5H_{11}$ and $C_7H_{15}$ isomers.
[c] Wavelength of maximum absorption (in nm) in UV-VIS spectrum; solvent was 40–80% methanol-$10^{-3}$ molar aqueous HCl.
[d] Extinction coefficient in L cm $mol^{-1}$.

NMR Spectroscopic Data

The structure of the orange water-insoluble precursor pigment I was confirmed from C-13 NMR data using carbon-carbon connectivity information obtained from INADEQUATE (Incredible Natural Abundance Double Quantum Transfer Experiment) pulse sequence. A similar experiment was performed on III where $R_2 = -CH_2COOC_2H_5$. The results of this experiment, details of which will be furnished upon request, confirmed the structure of the yellow pigment as III.

C-13 NMR spectra were obtained on several samples of III dissolved in methanol-$d_4$. Carbon spectra were obtained at 75 MHz on an NT 300 spectrometer using a bilevel broad band proton decoupling (0.5 and 5 watts), 45° pulse, sweep width of 10,000 Hz, 8K data points, and the delay between pulses of 2 seconds. The shifts were referenced to the solvent $CD_3OD$ peak which appears at 49 ppm relative to tetramethylsilane. Results are summarized in the following table. The numbering system used in the table is that of the following figure, where numbers 1–5 refer to the carbons of the side chain $R_1$.

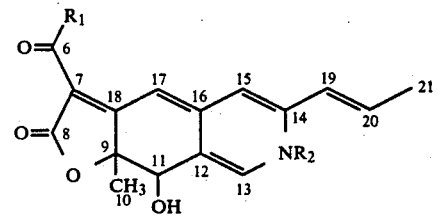

TABLE 2

| C-13 NMR Shifts of Monascus Based Yellow-Pigments | | | | | | | | |
|---|---|---|---|---|---|---|---|---|
| | | | | Reduced Pigment | | | | |
| $R_2NH_2$ | Glycine[a] | Leucine | i-butylamine | Ethanolamine | Glucamine | Aspartame | Taurine | Glycine Ethyl Ester |
| C-1 | 14.31 | 14.31 | 14.3 | 14.3 | 14.3 | 14.4 | 14.4 | 14.3 |
| C-2 | 23.57 | 23.53 | 23.58 | 23.6 | 23.5 | 23.2 | 23.6 | 23.5 |
| C-3 | 30.648 | 30.68 | 30.57 | 30.7 | 30.6 | 30.3 | 30.6 | 30.2 |
| C-4 | 26.62 | 26.17 | 26.54 | 26.9 | 26.5 | 26.6 | 26.5 | 26.7 |
| C-5 | 40.66 | 40.69 | 40.72 | 40.74 | 0.7 | 40.9 | 40.8 | 40.9 |
| C-6 | 198.7 | 198.95 | 198.93 | 199.3 | 198.5 | 199.1 | 198.9 | 199.2 |

TABLE 2-continued

C-13 NMR Shifts of Monascus Based Yellow-Pigments
Reduced Pigment

| $R_2NH_2$ | Glycine[a] | Leucine | i-butylamine | Ethanolamine | Glucamine | Aspartame | Taurine | Glycine Ethyl Ester |
|---|---|---|---|---|---|---|---|---|
| C-7 | 99.49 | 99.1 | 99.34 | 99.6 | 99.5 | 99.5 | 99.5 | 99.5 |
| C-8 | 172 | 169.15 | 169.3 | 169.2 | 169.43 | 170.3 | 169.4 | 170.8 |
| C-9 | 83.94 | 83.95 | 83.815 | 83.9 | 83.9 | 83.7 | 83.8 | 84 |
| C-10 | 30.252 | 30.26 | 30.29 | 30.3 | 30.3 | 30.3 | 30.6 | 30.6 |
| C-11 | 73.43 | 73.6 | 73.3 | 73.4 | 73.5 | 73.6 | 73.4 | 73.5 |
| C-12 | 130.87 | 130.61 | 130.7 | 130.6 | 130.9 | 130.1 | 130.9 | 130.6 |
| C-13 | 139.52 | 140.57 | 140.76 | 140.6 | 139.3 | 141.7 | 139 | 141.4 |
| C-14 | 153.58 | 153.19 | 151.05 | 151.4 | 153.5 | 151.8 | 153.7 | 154.1 |
| C-15 | 116.68 | 117.21 | 116.8 | 116.9 | 116.7 | 117.3 | 116.8 | 116.2 |
| C-16 | 151.59 | 152.1 | 151.05 | 151.4 | 151.7 | 151.8 | 151 | 151.9 |
| C-17 | 98.3 | 98.51 | 98.76 | 98.8 | 99 | 99.5 | 99.5 | 99.5 |
| C-18 | 175.94 | 175.93 | 175.76 | 175.7 | 175.8 | 175 | 175.8 | 175.6 |
| C-19 | 123.4 | 124.07 | 123.4 | 123.6 | 123.5 | 123.8 | 123.2 | 122.8 |
| C-20 | 139.52 | 136.37 | 138.1 | 139.2 | 139.1 | 138 | 138.9 | 139.1 |
| C-21 | 19.07 | 18.958 | 19.05 | 19.2 | 19.06 | 19.4 | 19.2 | 19.3 |
| C-N | | 67 | 62.9 | 61.5 | 59.9 | 63.1 | 46 | |

What is claimed is:

1. A method of imparting a yellow color to an edible formulation comprising adding to an edible formulation an amount effective to impart said yellow color of a water-soluble yellow pigment of formula

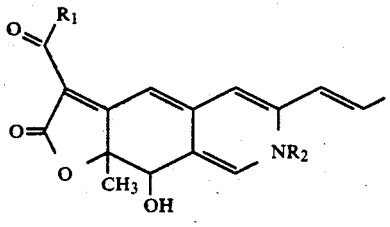

where $R_1$ is $C_5H_{11}$, $C_7H_{15}$, or a mixture thereof, and where $R_2$ is such that $R_2NH_2$ is selected from the group consisting of amino acids, alkyl esters of amino acids whose alkyl group contains up to 10 carbon atoms, amino alcohols, dipeptides, alkyl esters of dipeptides whose alkyl group contains up to 10 carbon atoms, aliphatic and cycloaliphatic amines containing from 2 to 10 carbon atoms, and polymeric amines.

2. The method of claim 1 where $R_2NH_2$ is an amino alcohol.

3. The method of claim 2 where the amino alcohol is a polyhydric amino alcohol.

4. The method of claim 1 where $R_2NH_2$ is a dipeptide, each of whose amino acid constituents is a naturally occurring amino acid.

5. The method of claim 1 where $R_2NH_2$ is a naturally occurring amino acid.

6. The method of claim 1 where $R_2NH_2$ is an alkyl ester of a naturally occurring amino acid whose alkyl portion contains from 1 to 4 carbon atoms.

7. The method of claim 1 where $R_2NH_2$ is an alkyl ester of a dipeptide, each of whose amino acid constituents is a naturally occurring amino acid and whose alkyl portion of the ester group contains from 1 to 4 carbon atoms.

8. The method of claim 7 where the dipeptide ester is aspartame.

9. The method of claim 2 where $R_2NH_2$ is an amine of a sugar alcohol, $HOCH_2(CHOH)_nCH_2NH_2$, where n is 2, 3, or 4.

10. The method of claim 9 where n=4.

11. The method of claim 9 where $R_2NH_2$ is glucamine.

12. A yellow pigment having the structure,

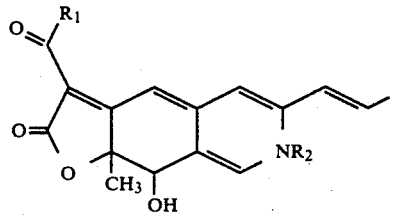

where $R_1$ is $C_5H_{11}$, $C_7H_{15}$, or a mixture thereof, and where $R_2$ is such that $R_2NH_2$ is selected from the group consisting of amino acids, alkyl esters of amino acids whose alkyl group contains up to 10 carbon atoms, amino alcohols, dipeptides, alkyl esters of dipeptides whose alkyl group contains up to 10 carbon atoms, aliphatic and cycloaliphatic amines containing from 2 to 10 carbon atoms, and polymeric amines, said colorant having an absorption maximum at a wavelength in the region from about 465 to about 515 nanometers with an extinction coefficient of at least $4 \times 10^4$ L cm mol$^{-1}$.

13. The yellow pigment of claim 12 where $R_2NH_2$ is an amino alcohol.

14. The yellow pigment of claim 12 where the amino alcohol is a polyhydric amino alcohol.

15. The yellow pigment of claim 12 where $R_2NH_2$ is a dipeptide, each of whose amino acid constituents is a naturally occurring amino acid.

16. The yellow pigment of claim 12 where $R_2NH_2$ is a naturally occurring amino acid.

17. The yellow pigment of claim 12 where $R_2NH_2$ is an alkyl ester of a naturally occurring amino acid whose alkyl portion contains from 1 to 4 carbon atoms.

18. The yellow pigment of claim 12 where $R_2NH_2$ is an alkyl ester of a dipeptide, each of whose amino acid constituents is a naturally occurring amino acid and whose alkyl portion of the ester group contains from 1 to 4 carbon atoms.

19. The yellow pigment of claim 18 where the dipeptide ester is aspartame.

20. The yellow pigment of claim 13 where $R_2NH_2$ is an amine of a sugar alcohol, $HOCH_2(CHOH)_nCH_2NH_2$, where n is 2, 3, or 4.

21. The yellow pigment of claim 20 where n=4.

22. The yellow pigment of claim 20 where $R_2NH_2$ is glucamine.

23. A water-soluble yellow food colorant having the structure,

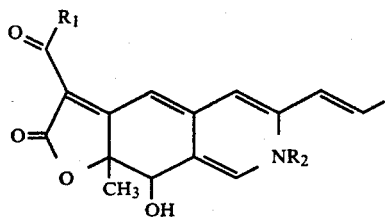

where $R_1$ is $C_5H_{11}$, $C_7H_{15}$, or a mixture thereof, and where $R_2$ is such that $R_2NH_2$ is selected from the group consisting of amino acids, alkyl esters of amino acids whose alkyl group contains up to 10 carbon atoms, amino alcohols, dipeptides, alkyl esters of dipeptides whose alkyl group contains up to 10 carbon atoms, aliphatic and cycloaliphatic amines containing from 2 to 10 carbon atoms, and polymeric amines, said colorant having an absorption maximum at a wavelength in the region from about 465 to about 515 nanometers with an extinction coefficient of at least $4 \times 10^4$ L cm mol$^{-1}$ and imparting no perceptible objectionable taste when added to edible formulations intended for human consumption at a concentration effective to impart a yellow color.

24. The water-soluble yellow food colorant of claim 23 where $R_2NH_2$ is an amino alcohol.

25. The water-soluble yellow food colorant of claim 23 where the amino alcohol is a polyhydric amino alcohol.

26. The water-soluble yellow food colorant of claim 23 where $R_2NH_2$ is a dipeptide, each of whose amino acid constituents is a naturally occurring amino acid.

27. The water-soluble yellow food colorant of claim 23 where $R_2NH_2$ is a naturally occurring amino acid.

28. The water-soluble yellow food colorant of claim 23 where $R_2NH_2$ is an alkyl ester of a naturally occurring amino acid whose alkyl portion contains from 1 to 4 carbon atoms.

29. The water-soluble yellow food colorant of claim 23 where $R_2NH_2$ is an alkyl ester of a dipeptide, each of whose amino acid constituents is a naturally occurring amino acid and whose alkyl portion of the ester group contains from 1 to 4 carbon atoms.

30. The water-soluble yellow food colorant of claim 29 where the dipeptide ester is aspartame.

31. The water-soluble yellow food colorant of claim 24 where $R_2NH_2$ is an amine of a sugar alcohol, $HOCH_2(CHOH)_nCH_2NH_2$, where n is 2, 3, or 4.

32. The water-soluble yellow food colorant of claim 31 where $n=4$.

33. The water-soluble yellow food colorant of claim 31 where $R_2NH_2$ is glucamine.

* * * * *